SHUTTLE LATCH FOR THE TRANSFER TABLE BALE HOOKS ON A BALE WAGON

BACKGROUND OF THE INVENTION

This application relates generally to bale-handling wagons and specifically to a bale wagon which is capable of unloading hay bales from the wagon one bale at a time.

With the introduction of the automatic bale-handling wagon, of the type shown and described in application Ser. No. 755,141, filed Aug. 26, 1968, now Pat. No. 3,502,230 it was necessary to provide some means which could be used in conjunction with the second, or transfer table, to adapt the wagon to unload bales one bale at a time, in addition to being able to automatically form a composite stack on the wagon and deposit the entire stack on the ground, as shown by U.S. Pat. No. 2,848,127, issued to Grey on Aug. 19, 1958. If the transfer table was to be used both as a tier-forming support and tier-discharging support, then it was necessary to separate the upper bales in the tier placed on the table during the discharge operation from the lower bales which were to be discharged so as to assure that the bales would be discharged one bale at a time. The discharge means and the bale engaging and separating means had to be synchronized to operate together in a simple but expeditious manner to assure that the complete bale tier was discharged one bale at a time without interfering with each other.

The transfer table, made well known by the Grey Patent (cited hereinbefore), was not adapted to function as a support means from which the wagon could be either loaded or unloaded. The Grey-type wagon was adapted only to form a composite stack of bales by accumulating individual bale tiers on the transfer table and subsequently placing them on the load bed. A so called second generation wagon, of the type hereinafter to be described, however, is adapted to do not only what the Grey wagon could do, but in addition, it is capable of single-bale unloading the bales from the transfer table. To accomplish this, the transfer table was redesigned to accommodate a cross conveyor, adaptable as a discharge means, which would move two bales at a time transversely across the transfer table to the edge where they are discharged from the table one bale at a time. When the transfer table is supporting a bale tier for discharge, the bottom two bales of the tier will be removed first. However, it is necessary, in order to assure even flow of the bales from the wagon, to separate the upper bales of the tier from the bottom most bales so that the conveyor can move them. The separation should last long enough to permit the last of the two bottom bales to be removed from the table, then permitting the remaining bales to slide down the inclined table so that the next two bales are discharged. Once the next two bales are ready to be moved by the conveyor, the remaining upper bales again need to be separated from the lower bales. This process must be repeated until all the bales of each bale tier are discharged from the wagon.

SUMMARY OF THE INVENTION

Accordingly, the primary object of the present invention is to provide means to facilitate the unloading of a bale wagon one bale at a time from the transfer table which will provide synchronous operation of the discharge means and the bale engaging and separating means.

Another object of the invention is to provide a mechanism which is engageable with the discharge means and operatively connected to the bale engaging and separating means to cause actuation of the bale-engaging means.

Another object of the present invention is to provide a mechanism which is capable of assuming two operable positions which will in turn cause the bale-engaging means to be moved from a first operative position to a second operative position.

A further object of the invention is to provide a means to actuate the bale-engaging means which is operable in response to movement of the discharge means.

Other objects of the present invention will become apparent from the complete description found within the specification and the appended claims.

BRIEF DESCRIPTION OF THE DRAWINGS

FIG. 1 is a side elevational view with the transfer table in its inclined position for single bale unloading;

FIG. 2 is a fragmentary side elevational view showing the bale hooks in the position for engaging and separating the upper bales from the lowermost bales being unloaded;

FIG. 3 shows the underside of the transfer table illustrating the shuttle and the associated mechanism for actuating the bale hooks;

FIG. 4 is an enlarged cross-sectional view taken on the line 4—4 of FIG. 1;

FIG. 5 is a fragmentary cross-sectional view similar to FIG. 4, but showing the shuttle advanced to the position of latching the bale hook-actuating lever in its position of raising the bale hooks and also showing the chain hook released and the chain lug advanced to engage the bale indicated in dot-dash lines; and FIG. 6 is a plan view of the shuttle taken as indicated by the arrows 6—6 in FIG. 7;

FIG. 7 is a side view of the shuttle in its position in which the chain hook will be released from the chain as the shuttle moves to its furthest right hand position as viewed in the figure;

FIG. 8 is a sectional view taken on the line 8—8 of FIG. 7; and

FIG. 9 is a side view showing the chain hook in its released position with the shuttle moving to its furthest left hand position as viewed in the figure.

DESCRIPTION OF THE PREFERRED EMBODIMENT

Referring now specifically to FIG. 1, a bale wagon 10 having a chassis structure comprised of a pair of fore-and-aft extending beams 16, only one of which is shown in FIG. 1, is provided with a pair of wheels 12 only one being shown, which adapt the chassis structure to move over the ground.

A receiving table, indicated generally by the numeral 150, is disposed at the forward end of the chassis structure and is pivotally mounted about point 162 with respect to said chassis structure by means of hydraulic cylinder 502 which is pivotally connected at 166 to the receiving table and fixed to bracket 172 which is mounted on transverse frame members 70. As is well known in the art, a bale pickup means, not shown, directs bales from the field to the receiving table where they are accumulated and then placed on the transfer table 200 disposed in a normally horizontal position, not shown, immediately behind the receiving table 150.

The transfer table 200 is comprised in part of an L-shaped structure 202, having a forwardly extending leg 204 and a rearward upwardly extending leg 206. The legs 204 and 206 are disposed at right angles to each other. The table 200 is pivotally mounted with respect to the chassis structure being pivotal about pins 208 which are mounted in depending lugs 210, only one of each being shown. The forward end of the table is provided with a transverse beam member 211 and the bed forms a support means for bales having an upper surface 215. The transfer table is pivoted upon actuation of hydraulic cylinder 508 which is pivotally connected to a load bed 250 at 216 and by the other end pivotally connected at 218 to rearwardly extending member 220, which is, in turn, fixed to the L-shaped member 202. When the second, or transfer table is disposed in the single bale-unloading position, the inclined position shown in FIGS. 1 and 2, the table is held in that position by support member 232 shown in FIGS. 1 and 2.

The load bed, or load rack 250 is also mounted on the chassis structure in the normally inclined position shown in FIG. 1. The bed 250 has a forward end portion 252 and forms a support surface 254. The entire load bed is also pivotal with respect to the chassis by pin 256 to rearwardly and upwardly

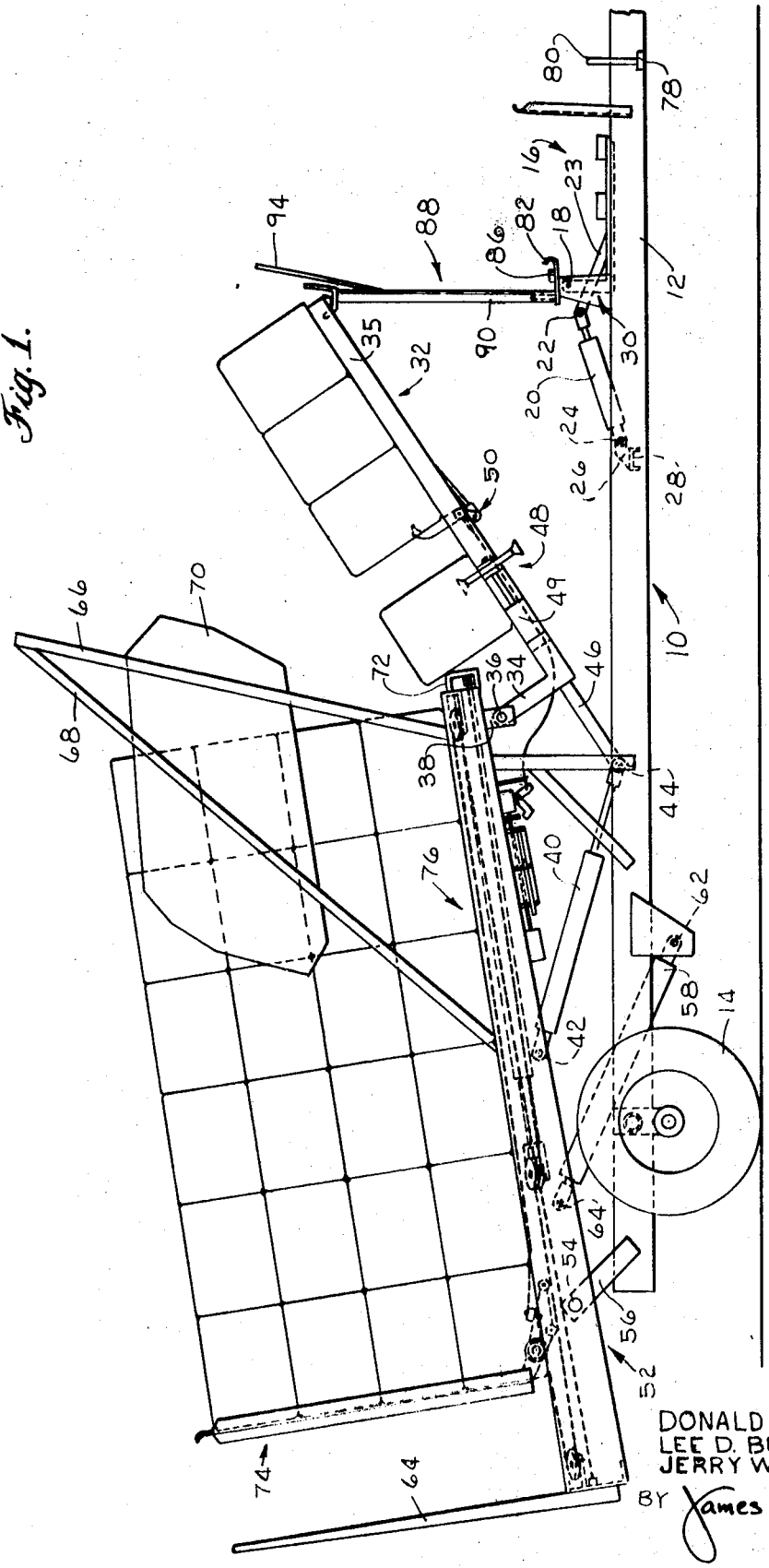

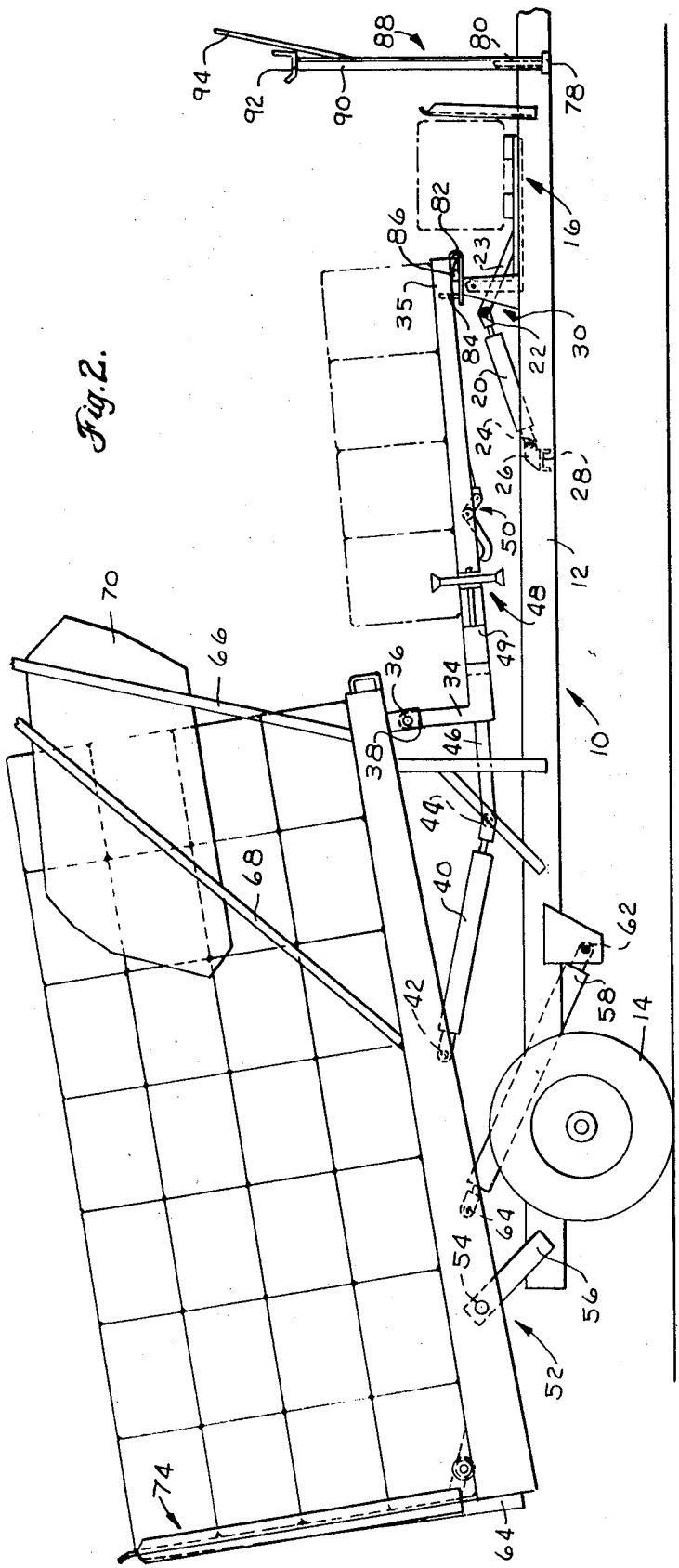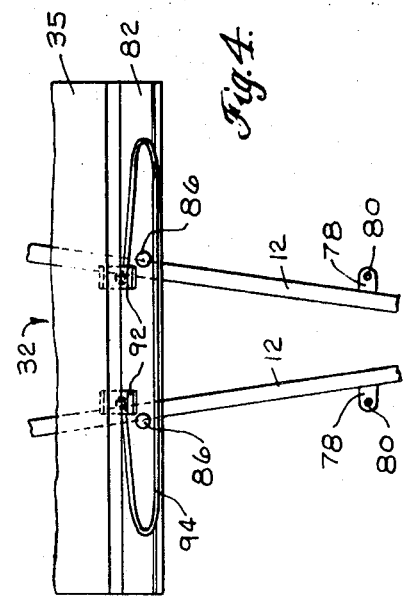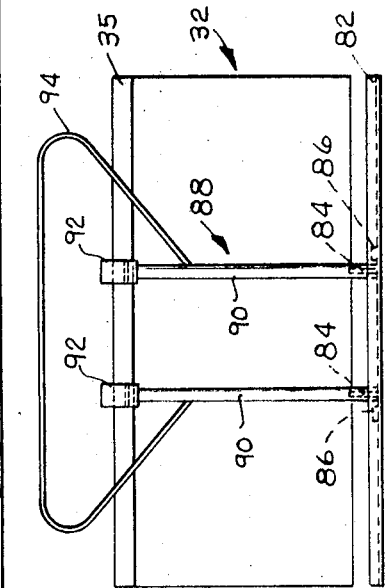

3,610,441

TABLE SUPPORT FOR A BALE WAGON

BACKGROUND OF THE INVENTION

This invention relates generally to automatic bale-handling wagons and specifically to bale wagons capable of unloading successive bale tiers from the second, or transfer table, one bale at a time.

While it has long been known to use automatic bale wagons to pick up bales from the field and form them into a composite stack on the wagon (see U.S. Pat. No. 2,848,127 issued Aug. 19, 1958, to Grey), it is only recently that the Grey-type wagon has been further advanced to a point where it is now possible to unload bales not only in a composite stack and to retrieve that stack, but it is also possible to unload the bale stack from the wagon one bale at a time (see Ser. No. 755,141, filed Aug. 26, 1968). To use the second, or transfer table, of the wagon to both form and discharge successive bale tiers presented several problems. One of these problems involved the raising of the transfer table to a point intermediate the path of travel from a near horizontal position to a generally vertical position and once achieving that position, keeping the table in place. The hydraulic cylinders used to power the tables during the tier formation and the stack formation were not powerful enough to assure that the table could be held in the inclined position during the unloading operation without the threat of failing.

The angle at which the transfer table is inclined during the discharging operation is also important to assure uninterrupted bale discharge. Without some sort of a guide, there would be no way for the operator to tell if the table was properly positioned during each unloading operation.

SUMMARY OF THE INVENTION

Accordingly, then, the present invention affords a means of not only supporting the transfer table during the single bale-unloading operation, but it will also assure that the inclination of the table is uniform and proper for all unloading operations.

An object of the present invention is to provide a table support which is portable between a stored position on the forward portion of the chassis structure and an operable position in engagement with the transfer table.

Another object of the invention is to provide a table support which is inexpensive to manufacture and easy to install and remove.

A further object of the invention is to provide a table support which is removably engageable with another table support fixed to the chassis and on which the transfer table bears during the tier forming operation.

A still further object of the invention is to provide a table support which will prevent bales placed on the transfer table for discharge from being forced over the front of the table during the unloading operation.

Other objects of the invention will become apparent from the description of the preferred embodiment and from the amended claims.

BRIEF DESCRIPTION OF THE DRAWINGS

FIG. 1 is a side elevational view of a single bale-unloading wagon showing the transfer table inclined and supported by the table support of the present invention;

FIG. 2 is a side elevational view showing the table support in its stored position forward of the receiving table;

FIG. 3 is a front view of the table support illustrating the support in engagement with the inclined table; and FIG. 4 is a fragmentary plan view of FIG. 3 showing the support, the inclined table and the lugs and pins on the forward portion of the chassis for storing the support when not in use.

DESCRIPTION OF THE PREFERRED EMBODIMENT

Referring now specifically to the drawings a bale wagon having a chassis structure shown generally as 10, in FIG. 1, is provided with a pair of longitudinally extending beam members 12 which converge at their forward ends, as seen in FIG. 4. A pair of wheels 14, only one of which is shown, are disposed rearwardly on the chassis structure 10 and adapt the wagon to be moved over the ground. At the forward end of the chassis structure there is provided a receiving table 16 which is pivotally mounted with respect to the chassis about pivot point 18 upon actuation of hydraulic cylinder 20 through means not shown. The hydraulic cylinder 20 is pivotally connected by its rod end 22 to a rearwardly extending link member 23 that is fixed to the receiving table. The rear end of cylinder 20 is pivotally connected at 24 to a bracket 26 which is fixed on the transverse frame member 28.

A support means 30 is located rearwardly of the receiving table 16 and is adapted to support a transfer table 32 when the table is in the position shown in FIG. 2 of the drawings. Transfer table 32 is comprised of an upwardly extending leg portion 34 and a forward portion 35, the leg portion 34 being pivotally connected at 36 to a pair of depending brackets 38. In this instance, only one bracket and pivotal connection is shown. A hydraulic cylinder 40, pivotally connected by its rearward end at 42 and its rod end 44 to a rearwardly extending link member 46 fixed to the transverse table 32, will pivot the table 32 about a horizontally extending axis through point 36 between a generally horizontal position shown in FIG. 2 and a vertical position, not shown. The transfer table 32 is also provided with discharge means 48 comprising a conveyor chain which is driven by a motor 49 and bale engaging and separating means 50 for separating the upper bales and the bale tier from the lower bales of a bale tier, as shown in FIG. 1.

Mounted rearwardly on the chassis structure 10 is a load bed indicated generally by numeral 52. It is from the load bed 52 that the brackets 38 are fixed and depend, and to which the cylinder 40 is pivotally connected. The load bed 52 is also pivotally mounted with respect to the chassis structure at 54 through a bracket 56 which is fixed to the longitudinally frame members and extend upwardly and rearwardly therefrom. A hydraulic cylinder 58 which is pivotally connected to the chassis structure by one end 62 and pivotally connected to the underside of the load bed at 64 is used to pivot the load bed from its generally inclined position shown in FIGS. 1 and 2 to a position generally perpendicular to the chassis structure, that position not being shown or described in this application. At the rear of the load bed there are provided a pair of spaced apart upwardly extending forks 64 which are fixed by their lower end to the load bed. At the forward end of the load bed front and rear strut members 66 and 68, respectively extend upwardly from the load bed and converge at their upper ends, as shown in FIG. 1. A side shield 70 is fixed to the upright strut members, one side shield on each side of the bale load bed for guiding successively received bale tiers from the transfer bed. At the very forward edge of the load bed 52 there is provided a box beam member 72 which extends across the entire front of the load bed and provides a bearing surface for bales being unloaded from the wagon as will hereinafter be described in detail.

To lend further support to the successive bale tiers being directed to the load bed during the stack forming operation, and to provide means for unloading the successively unloaded tiers back onto the transfer bed during the single bale unloading operation, there is provided a rolling rack 74 which is movable along the load bed in a fore-and-aft direction. Means for operating the rolling rack, generally indicated by the numeral 76 in FIG. 1, comprising a double acting hydraulic cylinder and a cable are provided on the load bed so that the rolling rack 74 may be power driven in a forward or rearward direction. The rolling rack and the actuating means have been more fully described in the earlier filed copending application Ser. No. 755,141 filed Aug. 26, 1968.

As those skilled in the art readily understand, the automatic bale unloading wagon is operated by moving the wagon over a field on which a plurality of hay bales have been deposited and they are picked up by means on the wagon (not shown in this application) and delivered to the receiving table 16. Bales are then accumulated on the receiving table until a trip member (not shown) is actuated which causes hydraulic cylinder 20 to pivot the receiving table upwardly so that the bales accumulated thereon are deposited on the front edge 35 of the rearwardly disposed transfer table 32. The transfer table 32 is in the bale forming position, the generally horizontally position shown in FIG. 2, and it is adapted to accumulate successive directed bales and form them into tiers of bales. When a complete bale tier has been formed, a trip mechanism, not shown, on the transfer table will be actuated to cause cylinder 40 to extend and pivot the transfer table in a vertical direction up toward the load bed 52 so that the tier of bales contained thereon are deposited on the load bed. The load bed in turn will accumulate successive delivered tiers until it is completely full and a composite bale stack has been formed. The entire stack may then be unloaded as a composite mass by actuating cylinder 58 and causing the load bed 52 to pivot about point 54 so that the load bed assumes a nearly vertical position. Then, by driving the wagon away, the entire stack of bales is left on the ground. By a reverse operation, the entire stack may be retrieved for transport to another location.

If the wagon operator desires to unload his completed bale stack one bale at a time, then he must actuate cylinder 40 to cause the transfer table 32 to assume an inclined position intermediate its tier-forming position and its vertical discharge position. In the inclined position, the second table will be used to discharge bale tiers from the wagon one bale at a time. As can readily be understood, as successive bale tiers are forced from the load bed by the forwardly moving rolling rack, they will topple over onto the inclined transfer table. Without some sort of brace or supporting means, it is probable that the second or transfer table 32 would eventually collapse, or at least be moved from the inclined position shown in FIG. 1. This is because the hydraulic cylinder 40 would not be large enough to support the table loaded with bales in this inclined position for a prolonged period of time. Therefore, it has been found necessary to provide a table support means 88 which will support the second, or transfer table, during the single bale unloading operation.

As can be seen in FIGS. 1, 2 and 4 of the drawing, a pair of tabs 78 are fixed to the longitudinally extending beam members 12 forwardly of the receiving table 16. The tabs 78 extend outwardly of the transverse beam members and are provided with upwardly extending pin members 80 adjacent the outer edges thereof.

The support means 30, disposed rearwardly of the receiving table 16 and under the front edge 35 of the transfer table 32, is comprised of a pair of upstanding bracket members 81 which are fixed by any suitable means to the longitudinally extending beams 12, and a transverse plate, or bight, member 82 which extends horizontally between the upright brackets and are suitably fixed to the upper ends thereof. The bight portion 82 is provided with a pair of spaced apart upwardly extending pin members 86 which are spaced apart at the same distance as are the pins 80. A pair of resilient bearing pad members 86 are also provided on the transverse plate member 82 and they are adapted to engage and support the forward end 35 of the transfer table 32 when it is in its bale forming position, shown in FIG. 2.

The table support means 88 is comprised of a pair of upright tube members 90 which are spaced apart and are adapted to be received on the upright pins 80 and 84 when the support means is placed in either one of its positions. At each upper end of the upright tube members 90, there is provided a generally U-shaped saddle member. The saddle members 92 are fixed to the tubes by any suitable and are adapted to engage and support the forward end 35 of the transfer table 32 when the transfer table is in its inclined, or single bale unloading position, illustrated in FIG. 1. A generally U-shaped inverted rod member 94 is connected by each end to the tube members 90, by any suitable means, and provides additional strength to the support member. As can be seen in the detailed figure, FIG. 3, the ends of the inverted U-shaped rod 94 are fixed to the upright tubes 90 intermediate their ends and the U-shaped member extends outwardly and upwardly above the tube members and the associated saddles. As can be seen in FIGS. 1 and 3, the U-shaped member 94 extends above the surface of the transfer table and in this manner it is adapted to engage and stop any bales which might be forced forwardly over the front end of the transfer table during the single bale-unloading operation.

With the table support 88 shown in a position illustrated in FIG. 1, the transfer table is completely supported during the entire single bale-unloading operation and it is kept at a very definite angle of inclination with respect to the chassis structure. In this way, it can be assured that bales will be discharged from the transfer table one bale at a time in an uninterrupted fashion. During the unloading operation, as a tier of bales is deposited on the transfer table for unloading, the bale engaging and separating means 50 is pivoted upwardly separating the upper bales of the bale tier from the lower bales of the bale tier and the discharging means 48 is actuated. As can be seen in FIG. 1, the bales are engageable with the transfer table bed and the leading edge of the box beam member 72 at the forward edge of the load bed 52.

During the tier-forming operation, or for composite stack discharge and retrieval, it is necessary that the transfer table 32 be permitted to assume its tier forming position, shown in FIG. 2. It is necessary then, to remove the table support 88 from the upright pin members 84 and place it in its stored position on pin members 80 forwardly of the receiving table. This is a manual operation and may be performed easily by merely pivoting the transfer table, upwardly lifting the support means from pins 84, and then placing the support member on the pins 80 so that the support assumes the position shown in FIG. 2 of the drawings. In this manner, the support means will not interfere with the normal operations of the machine, but it is easily accessible when the operator desires to discharge bales from his wagon in a one bale at a time operative mode.

While this invention has been described in connection with a single embodiment, it will be understood that this embodiment is capable of modification and that this application is intended to cover any variation, use, or adaptation following, in general, the principles of the invention and including such departures from the present disclosure as come within the known or customary practice in the art to which the invention pertains, and as fall within the scope or the limits of the appended claims.

Having thus described our invention, what we claim is:

1. A bale wagon comprising, in combination:
   a wheel-supported chassis structure adapted for movement over the ground;
   bed means mounted on said chassis structure for supporting a stack of bales;
   a transfer table moveably mounted forwardly of said bed means and adapted to load by accumulating bales into a tier at a first position and moving to a second position where the tier is deposited on said bed means to form said stack, said transfer table being further operative to assume a third unloading position for receiving a like tier from said bed means, whereby the bales of said tiers are unloaded individually from said transfer table;
   means engageable with said stack for moving a tier from said bed means to said transfer table when said transfer table is in the third unloading position; and
   support means selectively operative to extend from said chassis for engagement with said transfer table when in the third unloading position, thereby supporting said transfer table as tiers are moved from said bed means to said transfer table for unloading.

2. A bale wagon, as recited in claim 1, wherein said means for supporting said transfer table is movable to a stored position on said chassis structure out of engagement with said transfer table when said table is accumulating tiers and loading them onto said bed means.

3. A bale wagon, as recited in claim 1, wherein means are provided for supporting said transfer table in said first position and comprises spaced apart bracket means extending upwardly from said chassis structure, a connecting bight portion extending horizontally between said brackets, a pair of spaced pins on said bight portion and extending upwardly therefrom, and bearing means on said bight portion engageable with said table when said table is in said tier forming position.

4. A bale wagon, as recited in claim 3, wherein said means for supporting said transfer table in said third position comprises a table support including upright members engageable at one end thereof with said spaced pins and having saddle means at the other end thereof for engaging and supporting said table.

5. A bale wagon, as recited in claim 4, wherein said table support upright members comprise a pair of spaced apart tubes and said saddle means comprise generally U-shaped members fixed to the upper ends of said members, said members are connected by a generally inverted U-shaped rod fixed by each end to said members intermediate the ends thereof, said rod extending outwardly and upwardly above said saddle members and operable to prevent bales from falling from the front edge of said table during tier discharge.

6. A bale wagon comprising, in combination:
a wheel-supported chassis structure adapted for movement over the ground;
bed means on said chassis structure for receiving and accumulating successive hay bales thereon, said bed means including tier forming and discharging means having a generally horizontal tier forming position and an inclined tier discharging position;
means on said chassis structure for supporting said tier forming and discharging means when said tier forming and discharging means is in said tier-forming position; and
means for supporting said tier forming and discharging means when said tier forming and discharging means is in said tier-discharging position, said discharging support means being engageable with said tier forming support means during tier discharge and comprised of a pair of spaced-apart upwardly extending tubes, a saddle member on an upper end of each tube and an inverted U-shaped rod fixed by each end to said tubes and extending outwardly and upwardly above said tubes and said saddles.

7. A bale wagon, as recited in claim 6, wherein said tier forming and discharging means comprises a transfer table and said discharging support means extends upwardly from said tier forming support means and engages a front edge of said table.

8. A bale wagon, as recited in claim 6, wherein said tier-forming support comprises a pair of spaced brackets on said chassis structure and extending upwardly therefrom, a bight portion connecting said brackets, a pair of spaced pins on said bight portion and extending upwardly therefrom and a pair of resilient bearing pads engageable with said table.

9. A bale wagon, as recited in claim 6, wherein said bed means further includes a receiving bed disposed forwardly of said tier forming and discharging means and said chassis structure is provided with a pair of outwardly extending tabs forwardly of said receiving bed, one of said tabs on each side of said chassis structure and said tabs having upwardly extending pins thereon.

10. A bale wagon, as recited in claim 9, wherein said tier-discharging support means being in a stored position engageable with said pins and said tabs when said tier forming and discharging means is in said tier forming position.

11. A bale wagon as recited in claim 1 wherein said support means includes an upright structure supported about the lower extremity thereof by said chassis structure, said support structure having saddle means at the upper extremity thereof for engagement with said transfer table for supporting the same in the third unloading position.